(12) United States Patent
Stack et al.

(10) Patent No.: US 10,677,228 B2
(45) Date of Patent: Jun. 9, 2020

(54) VAPOR PRESSURE SOLID ARTICLES AND METHODS FOR MAKING AND USING THE SAME

(71) Applicant: The Trustees of Columbia University in the City of New York, New York, NY (US)

(72) Inventors: Kenneth William Stack, New York, NY (US); Aslan Miriyev, New York, NY (US); Hod Lipson, New York, NY (US)

(73) Assignee: The Trustees of Columbia University in the City of New York, New York, NY (US)

(*) Notice: Subject to any disclaimer, the term of this patent is extended or adjusted under 35 U.S.C. 154(b) by 0 days.

(21) Appl. No.: 15/996,028

(22) Filed: Jun. 1, 2018

(65) Prior Publication Data

US 2018/0320669 A1    Nov. 8, 2018

Related U.S. Application Data

(63) Continuation-in-part of application No. PCT/US2016/064463, filed on Dec. 1, 2016.
(Continued)

(51) Int. Cl.
*F03G 7/00* (2006.01)
*B29C 49/46* (2006.01)
(Continued)

(52) U.S. Cl.
CPC ............. *F03G 7/005* (2013.01); *B25J 7/00* (2013.01); *B29C 49/46* (2013.01); *B29C 51/002* (2013.01);
(Continued)

(58) Field of Classification Search
CPC .... F03G 7/005; F03G 7/06; B25J 7/00; C08L 83/04; F15B 15/103; F16H 27/02;
(Continued)

(56) References Cited

U.S. PATENT DOCUMENTS 3,878,680 A * 4/1975 Dauvergne ............ F01K 21/04
60/511
4,161,210 A * 7/1979 Reid ..................... F28D 20/003
126/263.01
(Continued)

OTHER PUBLICATIONS

PCT/US2016/064463 International Search Report dated Feb. 17, 2017.

*Primary Examiner* — Hoang M Nguyen
(74) *Attorney, Agent, or Firm* — Bryan Cave Leighton Paisner LLP

(57) ABSTRACT

Disclosed are devices, systems, apparatuses, methods, products, and other implementations of vapor pressure solids. In some embodiments, a vapor pressure solid may include a one- or multi-component matrix material. In some embodiments, the multi-components matrix material is a two-part PDMS comprising a first and second matrix material. The first matrix material is capable of being mixed with one or more vaporizable fluids that causes the first matrix material to swell. The second matrix material is capable of being mixed with the swelled first matrix material to produce an actuating material. When the actuating material is heated, the one or more vaporizable fluids expand, resulting in vapors. The increased pressure applied by the vapors causes the actuating material to expand.

30 Claims, 20 Drawing Sheets

Related U.S. Application Data

(60) Provisional application No. 62/341,513, filed on May 25, 2016, provisional application No. 62/261,845, filed on Dec. 1, 2015.

(51) Int. Cl.

| | | |
|---|---|---|
| *B29C 51/12* | (2006.01) | |
| *B29C 51/10* | (2006.01) | |
| *B29C 51/00* | (2006.01) | |
| *B33Y 80/00* | (2015.01) | |
| *B25J 7/00* | (2006.01) | |
| *C08L 83/04* | (2006.01) | |
| *F03G 7/06* | (2006.01) | |
| *F15B 15/10* | (2006.01) | |
| *F16H 27/02* | (2006.01) | |
| *B29K 105/00* | (2006.01) | |
| *B29K 105/24* | (2006.01) | |
| *B29C 44/34* | (2006.01) | |
| *B29K 101/12* | (2006.01) | |
| *H05B 3/18* | (2006.01) | |

(52) U.S. Cl.
CPC ............ *B29C 51/006* (2013.01); *B29C 51/10* (2013.01); *B29C 51/12* (2013.01); *B33Y 80/00* (2014.12); *C08L 83/04* (2013.01); *F03G 7/06* (2013.01); *F15B 15/103* (2013.01); *F16H 27/02* (2013.01); *B29C 44/3484* (2013.01); *B29K 2101/12* (2013.01); *B29K 2105/0061* (2013.01); *B29K 2105/0064* (2013.01); *B29K 2105/24* (2013.01); *B29K 2995/0063* (2013.01); *H05B 3/18* (2013.01); *H05B 2203/014* (2013.01)

(58) Field of Classification Search
CPC ....... B33Y 80/00; B29C 51/10; B29C 51/006; B29C 51/002; B29C 51/12; B29C 49/46; B29C 44/3484; H05B 2203/014; H05B 3/18; B29K 2105/24; B29K 2101/12; B29K 2105/0064; B29K 2105/0061; B29K 2995/0063
USPC .................................. 60/649, 673, 527–529
See application file for complete search history.

(56) References Cited

U.S. PATENT DOCUMENTS

| | | | |
|---|---|---|---|
| 4,173,608 A | | 11/1979 | Soulier |
| 4,545,207 A | * | 10/1985 | Neary ...................... C09K 5/16 |
| | | | 165/104.12 |
| 5,002,709 A | | 3/1991 | Chevalier |
| 5,032,271 A | * | 7/1991 | Urry ....................... C07K 7/06 |
| | | | 210/350 |
| 6,530,958 B1 | | 3/2003 | Cima |
| 8,683,803 B2 | * | 4/2014 | Bastawros ................ F03G 7/00 |
| | | | 60/649 |
| 2008/0097557 A1 | | 4/2008 | Eggers |
| 2010/0024423 A1 | * | 2/2010 | McGinnis ............... F03G 7/005 |
| | | | 60/649 |
| 2011/0033608 A1 | | 2/2011 | Figuly |

\* cited by examiner

VAPOR PRESSURE SOLID ARTICLES AND METHODS FOR MAKING AND USING THE SAME

CROSS-REFERENCE TO RELATED APPLICATIONS

This application claims the benefit of, and priority to, international application No. PCT/US16/64463, entitled "Vapor Pressure Solid Articles and Methods for Making and Using The Same" filed Dec. 1, 2016, U.S. application No. 62/261,845, entitled "Vapor Pressure Solid Articles and Methods for Making and Using The Same," filed Dec. 1, 2015, and U.S. application No. 62/341,513, entitled "Vapor Pressure Solid Articles and Methods for Making and Using The Same," filed May 25, 2016, the entirety of each of the disclosures of which are explicitly incorporated by reference herein.

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

Actuating or 'smart' materials address the increasing needs of creating engineered material systems that provide diverse features relating to mechanical actuation, sensor abilities and artificial intelligence integration among others. Typically, these types of actuating materials are biologically inspired materials that integrate biological concepts and features in their structure and microstructure in order to create controllable and adaptive functionality of the material systems in which they are integrated. Furthermore, actuating materials rely on converting an input energy into a type of mechanical output such as force or displacement. As a result, they require the use of a prime mover (e.g., fluid, electromagnetic force etc.) and mechanisms to convert the functions of the prime mover to the desired effect. However, conventional actuating materials are inefficient. For example, the use of fluids in actuating materials requires hydraulic systems in order to provide adaptive control. Such hydraulic systems require the use of electric motors to power them and may also be prone to faults and defects. As a result, this may require several components that are not easily manufactured and that impair the ability to miniaturize the actuating system. Further, these components are not easily created with 3D printing.

SUMMARY

In some embodiments, methods and articles of manufacture for vapor pressure solids are provided. Specifically, articles of manufacture for electrochemical actuating materials are provided along with techniques for using and making the same. The methods disclosed herein, allow for the creation of 'smart' materials that can be controlled to provide adaptive functionality by applying electrically controlled chemical reactions and/or chemomechanical reactions that result in a change of volume (e.g., displacement) and a conversion of input energy to mechanical energy.

Actuating materials are increasingly used in areas where conventional actuators may not be suitable. Exemplary applications of such actuating materials can be found in microscopic and nano devices, robotic implementations (e.g., walkers, grippers, etc.), medical/biomedical devices, sensors, chemical equipment and architectural constructions.

In some embodiments, actuating materials are formed by composite materials that include one or more materials that can have different physical and chemical properties, and which when combined, can produce characteristics that are different from the properties of the individual components. Moreover, such actuating composite materials further include sensing, actuation and computation features. Such composite materials include at least one constituent material identified as a matrix material. For example, the matrix material surrounds and supports other reinforcement materials that enhance the matrix properties. In some embodiments, the actuation composite materials can include matrix components such as silicone rubber, latex, polymers (e.g., Polydimethysiloxane ("PDMS"), platinum-catalyzed PDMS, tin-catalyzed PDMS), resins etc. Accordingly, such materials do not require mechanical or hydraulic components for actuation purposes.

In some embodiments, the matrix material is infused by one or more vaporizable fluids, which effectively creates a combination of the matrix material properties and those of the infused fluid into a single bulk material. For example, such vaporizable fluids can include water, ethanol, acetone, glycerine, etheric compounds and/or other suitable fluids. In some embodiments, the fluid-infused composite materials are exposed to heat, which initiates a phase transition process for the vaporizable fluid (e.g., liquid-vapor transition). Specifically, heating the fluid will produce vapors that can apply pressure and inflate the matrix material due to a phase change (e.g., liquid-vapor) and/or due to a volume change, causing it to expand and stretch based on its physical properties. In addition, the heating of the vaporizable fluid can be achieved in a controlled manner such that the resulting expanded material can simulate the properties of biological tissue (e.g., muscle). In some embodiments, heating can be accomplished using various techniques. For example, heating can be accomplished by simple exposure of the bulk material to ambient temperature gradients, submersion of the bulk material in a water bath of increasing temperature, application of hot air using a heat gun, embedding of thermal elements (e.g., resistors) directly into the bulk material, mixing of conductive material (e.g., black carbon) during the manufacturing process of the bulk material and/or suitable combinations thereof. In some embodiments, controlled heating can be accomplished manually and/or automatically. Specifically, controlled heating may be employed using control feedback systems (e.g., proportional-integral-derivative ("PID") controllers, autonomous learning using machine learning, etc.) that can be external to or embedded within the actuating material measuring both external and/or internal temperature gradients. In addition, controlled heating can be performed in a uniform and/or non-uniform manner for one or more actuating materials, thus allowing for the actuation of complex structures. Such an actuation material can be used in biomimetic robotic implementations and/or as a sensor device. In some embodiments, the heating of the composite material can be performed in selected areas and/or on independent portions of the material. Furthermore, condensing the vapor by, for example, reducing the heating (or e.g., cooling) of the material can result in the contraction of the matrix material to its original state. In some embodiments, such functionality of the actuating material can be adaptively controlled to operate as a sensor (e.g., pressure, temperature sensor).

In some embodiments, the actuating material can also include a seal to ensure that the vaporizable fluid is not able to escape the matrix material. Moreover, additional mechanical components can be used and/or embedded in the material (e.g., pistons, springs, heating elements) to increase the energy output and/or force of the actuating material and allow for its use in different systems such as valve piping equipment, chemical equipment, etc. In some embodiments, reanimation of the actuating material can be performed by injecting, using infiltration, extraction and/or suitable procedures that reinfuses the matrix material with the vaporizable fluid to recover and/or configure the functionality of the matrix material.

In some embodiments, the actuating material can be used as an actuator in soft robotic applications. Specifically, the expansion and contraction of the actuating material can be used to facilitate the motion or manipulation of other robotic components. For example, a soft robot can include actuating material coupled to a front leg and a rear leg. Actuation and contraction of the actuating material will cause the front leg and/or rear leg to move, advancing the soft robot in a direction along the axis of contraction. In some embodiments, the soft robot can include a gripper having two fingers for manipulating an object. Actuation of the actuating material will cause the fingers to move inwards in a grasping motion and lock onto an object.

BRIEF DESCRIPTIONS OF THE DRAWINGS

FIGS. 11A, 11B, 11C, 11D, and 11E are examples of a soft-robot using an actuating material (FIG. 11C) illustrated during its initial phase (FIGS. 11A, 11D), its expanded phase (FIGS. 11B, 11E), in accordance with some embodiments of the disclosed subject matter.

Figure 12:
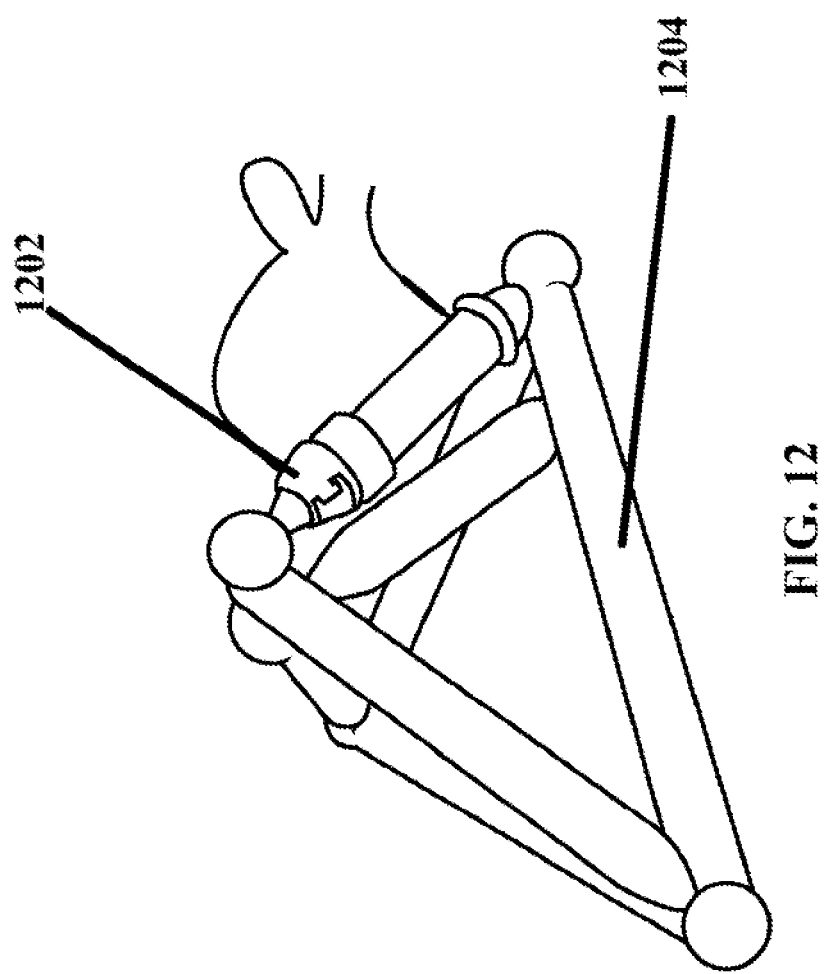

FIG. 12 is an example of a soft-robot using an actuating material in accordance with some embodiments of the disclosed subject matter.

Figure 13A:
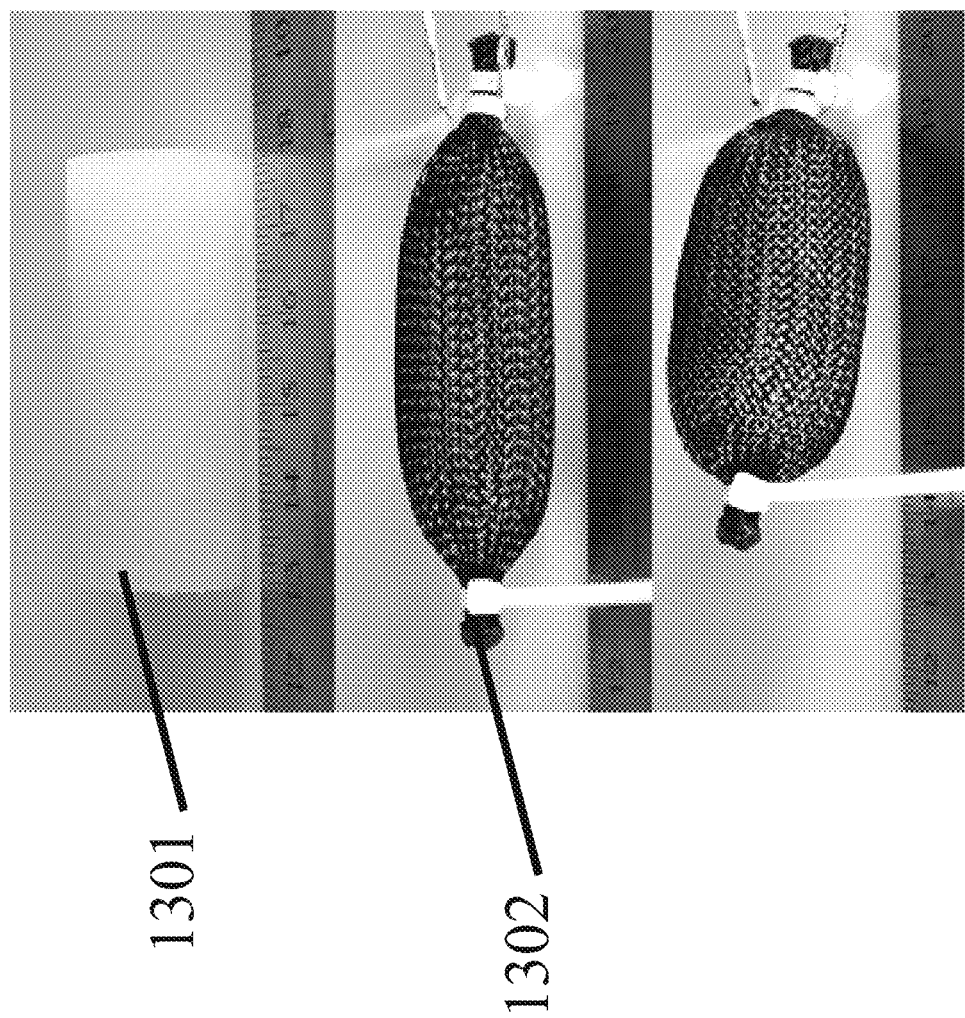
Figure 13B:
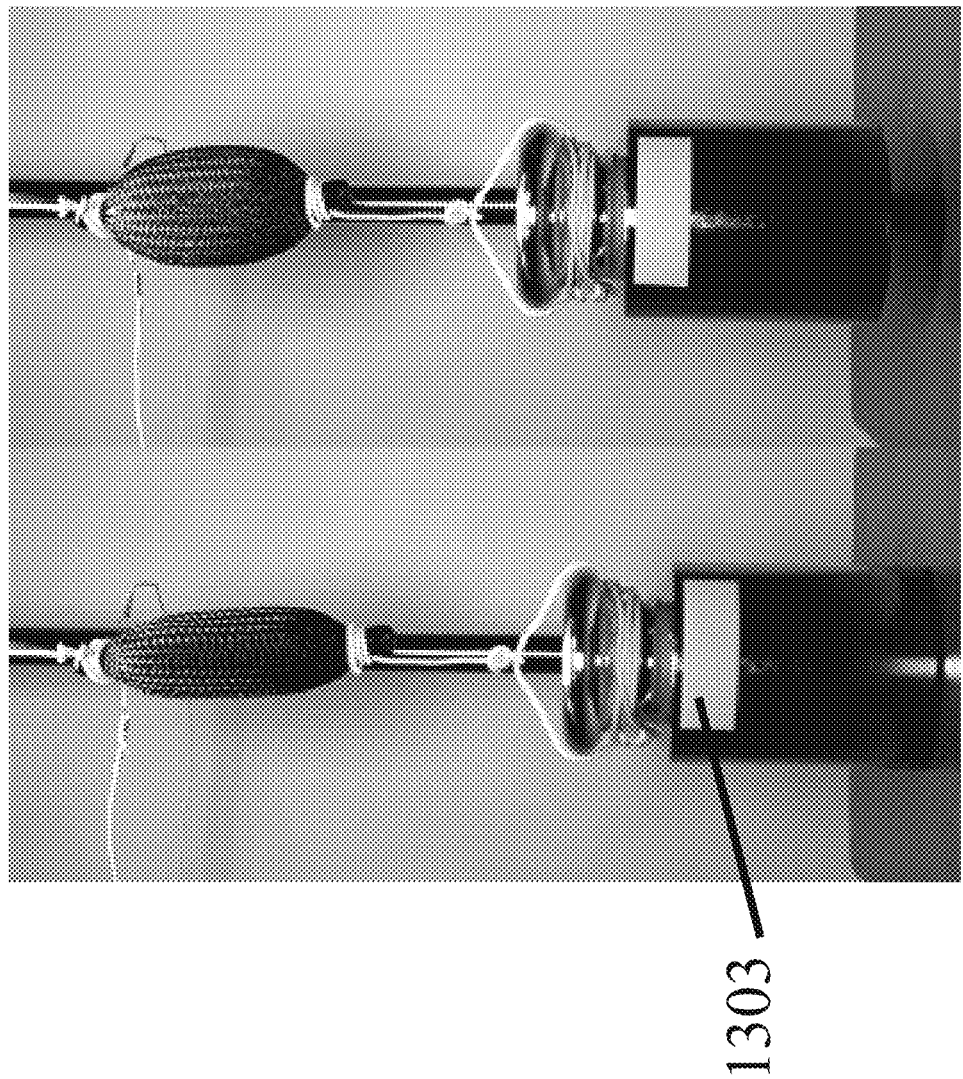
Figure 13C:
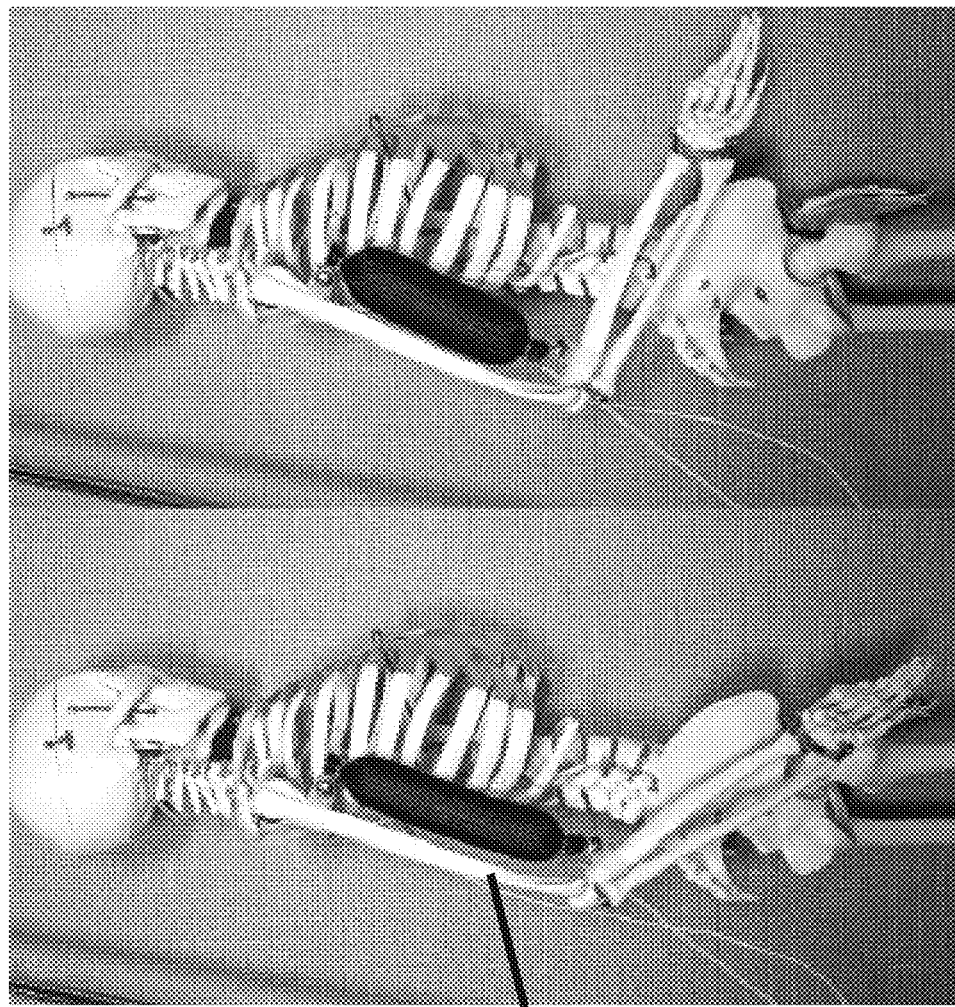

FIGS. 13A, 13B, and 13C are examples of a soft-robot using an actuating material to implement a McKibben-type muscle in accordance with some embodiments of the disclosed subject matter.

Figure 14:
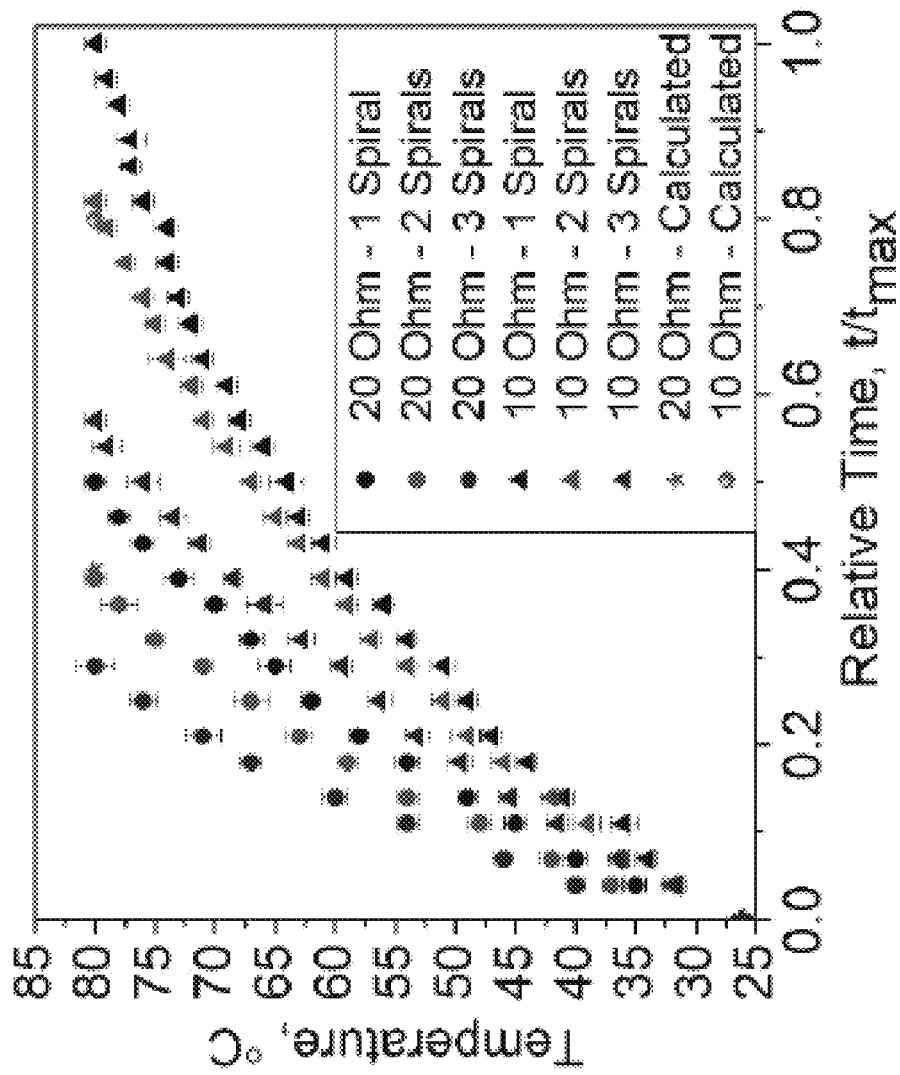

FIG. 14 is a graphical representation of heating times varying based on wire design in accordance with some embodiments of the disclosed subject matter.

Figure 15:
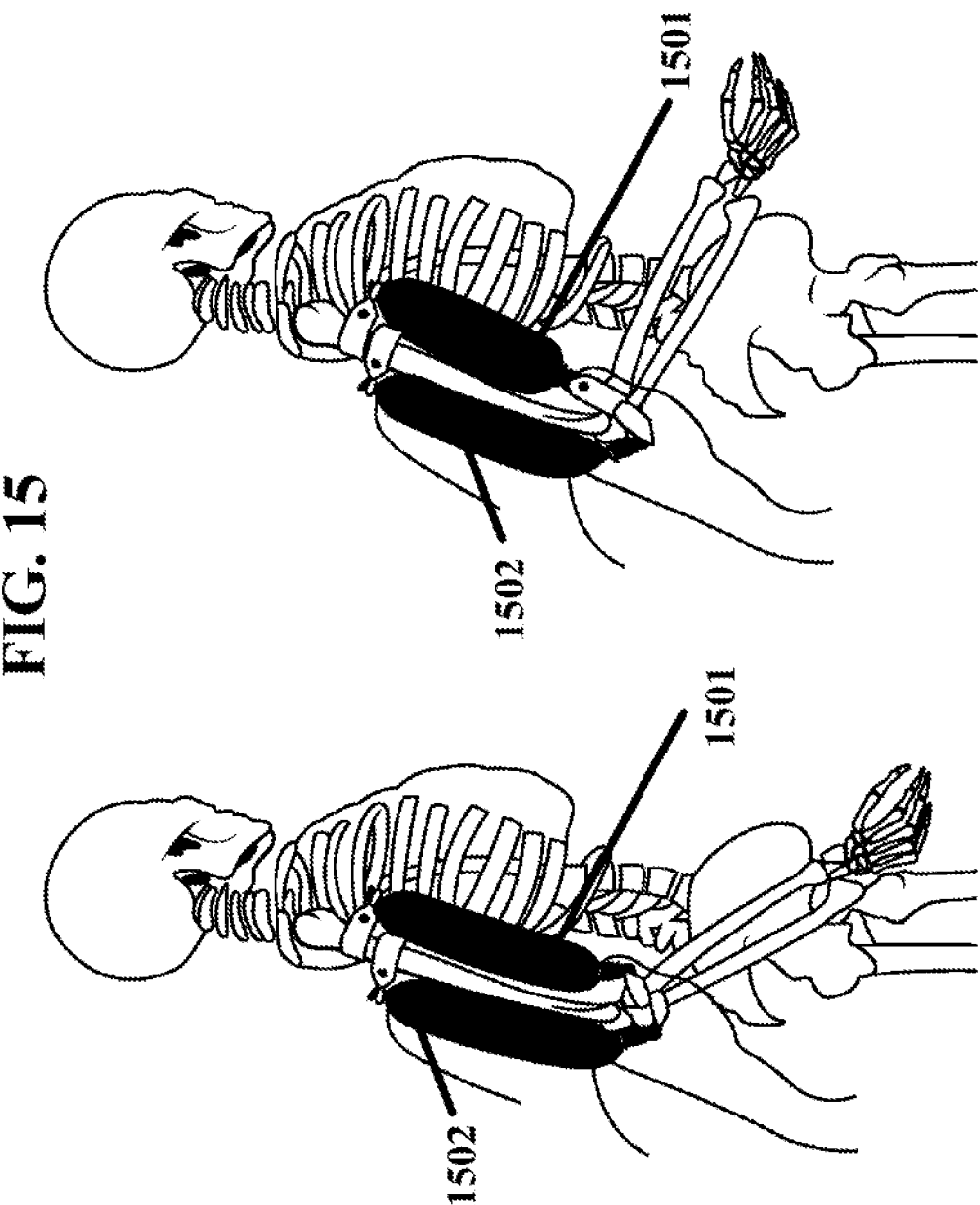

FIG. 15 is an example of a soft-robot using a vapor pressure solid actuating material to implement an agonist-antagonist bicep muscle pair in accordance with some embodiments of the disclosed subject matter.

Figure 16:
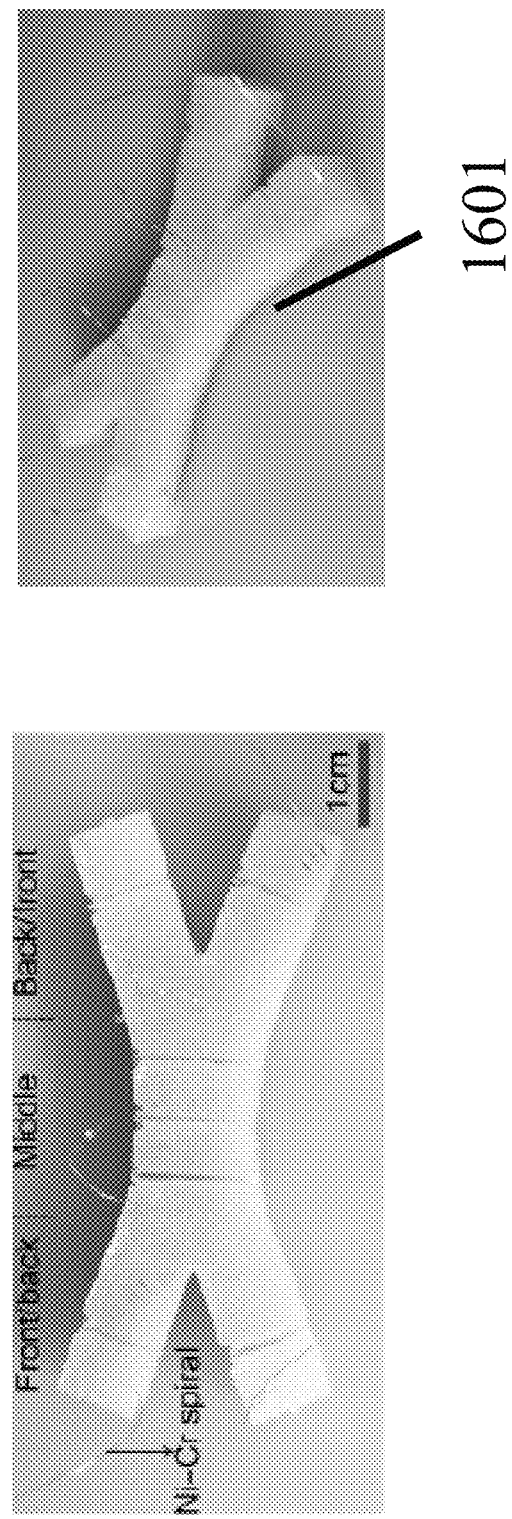

FIG. 16 is an example of a soft-robot using a vapor pressure solid actuating material to implement a soft walker robot for rejuvenation testing in accordance with some embodiments of the disclosed subject matter.

Figures 17, 17A, 17B:
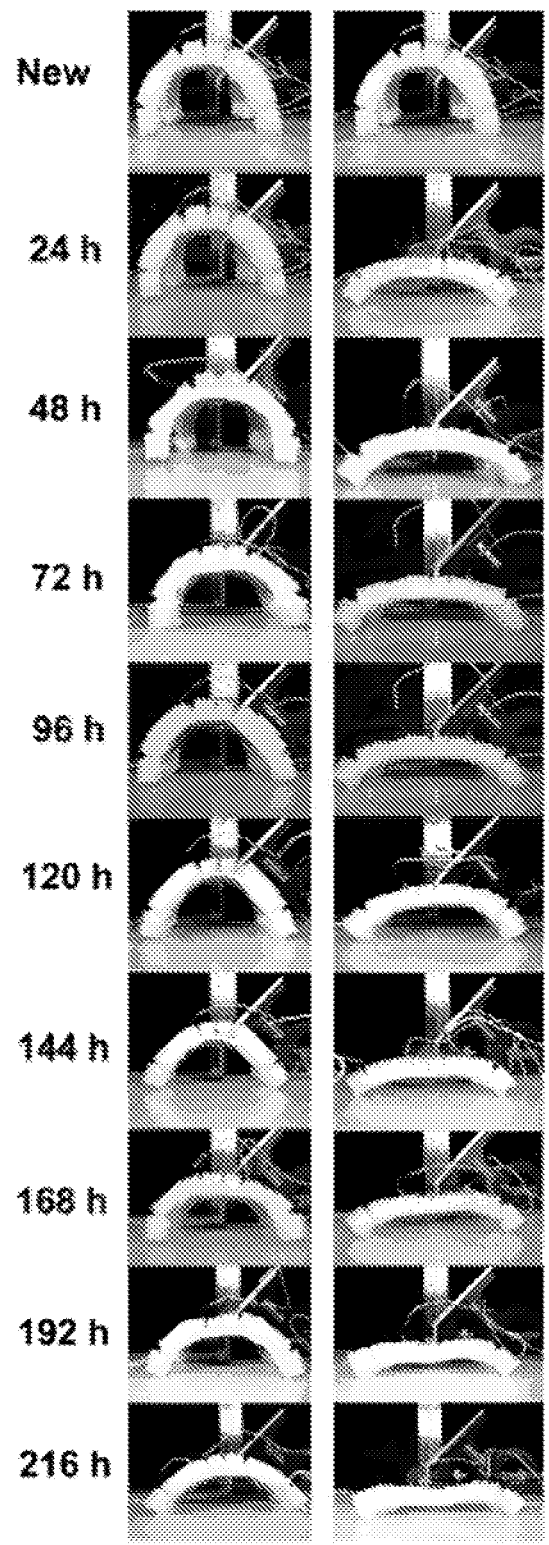

FIGS. 17(a) and 17(b) are representations of an example soft walker robot exhibiting bi-morph bending at different points in time in accordance with some embodiments of the disclosed subject matter.

DETAILED DESCRIPTION

The disclosed subject matter relates to vapor pressure solid articles and methods for making and using the same. In some embodiments, vapor pressure solids refer to actuating (e.g., 'smart') materials that are capable of producing an output force and/or displacement as a result of a chemical reaction. For example, such materials include matrix materials that are infused with a vaporizable fluid that can expand and/or contract the matrix based on its temperature. Additionally, these types of materials do not require additional mechanical components to provide the actuation (e.g., hydraulics, motors etc.) and, as a result, they can be manufactured in bulk using smart geometric design (e.g., 3D printing) and allow for miniaturization, thus enabling uses in various bio-inspired applications.

In the following description, reference is made to the accompanying drawings that form a part hereof, and in which are shown by way of illustration specific embodiments in which the inventive principles may be practiced. It is to be understood that other embodiments may be utilized and structural changes may be made without departing from the scope of the disclosed subject matter.

Figure 1:
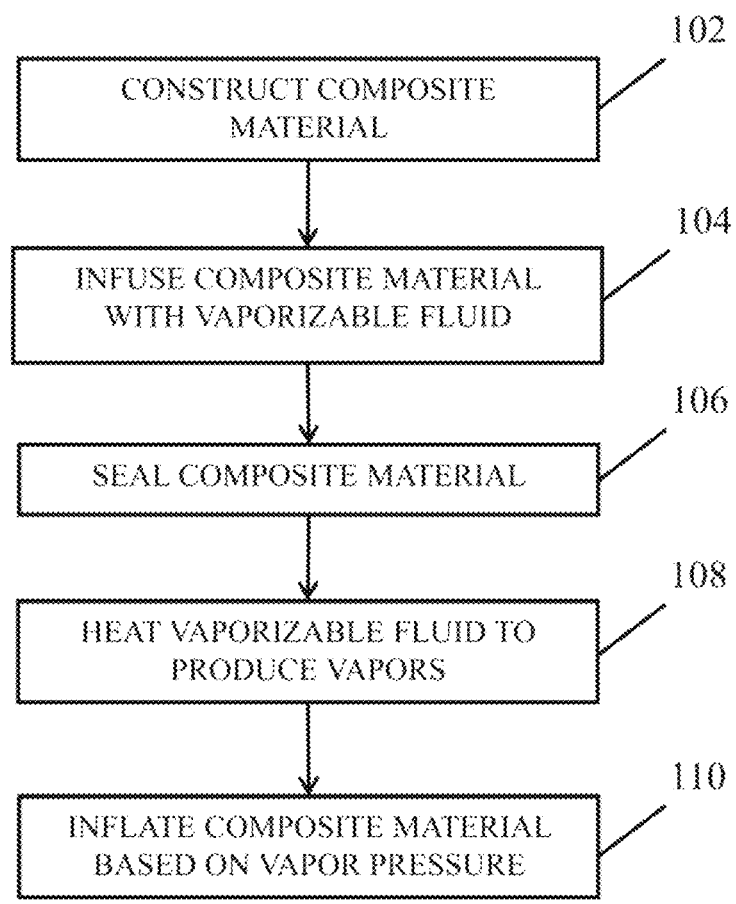
FIG. 1 is an example of a process that provides an actuating material in accordance with some embodiments of the disclosed subject matter.

FIG. 1 illustrates an exemplary method 100 for actuating a vapor pressure solid material in accordance with embodiments of the disclosed subject matter. Initially, at 102, a composite material including at least one constituent material (e.g., a matrix material) is provided. Specifically, a matrix material is selected to provide support to other materials and can include matrix components such as silicone rubber, latex, polymers (e.g., PDMS, platinum-catalyzed PDMS, tin-catalyzed PDMS), resins, or other suitable materials. In some embodiments, such a composite material can be constructed using a 3D printing technique or other suitable composition procedures. Matrix materials and vaporizable fluids can be chosen based on their chemical compatibility with each other, and other respective properties, such as the fluid's boiling point and handling restrictions, the matrix material's mechanical properties, or suitable properties.

At 104, the matrix material can be infused with a vaporizable fluid. In some embodiments an infusion can be performed using injections, infiltration of the matrix material or by using mechanical apparatuses (e.g., a Soxhlet extractor) or using suitable combinations thereof. In some embodiments, an infusion can consist of combining the vaporizable fluid with the matrix material, captivating the vaporizable fluid and/or soaking the matrix material in the vaporizable fluid. Additionally, in some embodiments the vaporizable fluid can include water, ethanol, acetone, glycerine, etheric compounds and/or other suitable fluids. Moreover, in some embodiments, a combination and/or emulsion of fluids can be automatically selected based on thermodynamic properties and desired output force from the actuating material. In some embodiments, the matrix material can be infused in an adaptive manner and at different concentrations so as to create the desired output.

At 106, the matrix material is sealed to create an insulation for the vaporizable fluid. In some embodiments, a sealing layer can be included in the matrix material using suitable materials or combinations thereof. Additionally, in some embodiments, the sealing layer can be a conductive material.

At 108, the matrix material, sealing layer and vaporizable fluid are heated so as to cause the fluid to vaporize. In some embodiments, heating can be accomplished using a heating element (e.g., one or more resistors embedded in the material) or through conductive heating by applying an adaptively controlled electrical current through the actuating material. For example, in such cases the actuating material can be modified to include one or more conductive elements and can be used alone and/or in combination with a conductive heater. Additionally, in some embodiments, a heating exchanger can be used to control the heating and/or cooling rates of the vaporizable fluid and subsequent expansion and contraction rates of the actuating material. Faster heating can be achieved using higher current or additional distributed heating networks, resulting in quicker vaporization of the vaporizable fluid. Similarly, faster cooling rates can be achieved based on the actuator's form-factor, surface-to-volume ratio, and convection currents.

At 110, heating of the vaporizable fluid results in the vaporization of the fluid, and the solid is inflated based on the pressure of the vapor. Specifically, such inflation of the bulk solid can be a result of the phase transition (e.g., liquid-vapor) and/or continuous expansion of the vapors. As a result, the actuating material can be dynamically stretched and/or contracted based on the vapor pressure infused in the matrix material. Moreover, the phase transition of the vaporizable fluid into vapor combined with the one or more matrix materials can cause large expansion of the matrix, which is not typically obtained through other actuating methods. In some embodiments, the actuating material can be used in a bimorph configuration to allow for mechanical structures that are independently controlled and can produce composite output forces. For example, such composite materials can be included in piston enclosures to provide pneumatic functionality. Additionally, the actuating material can also include mechanical components (e.g., springs) in order to increase the output force and/or displacement.

Figure 2:
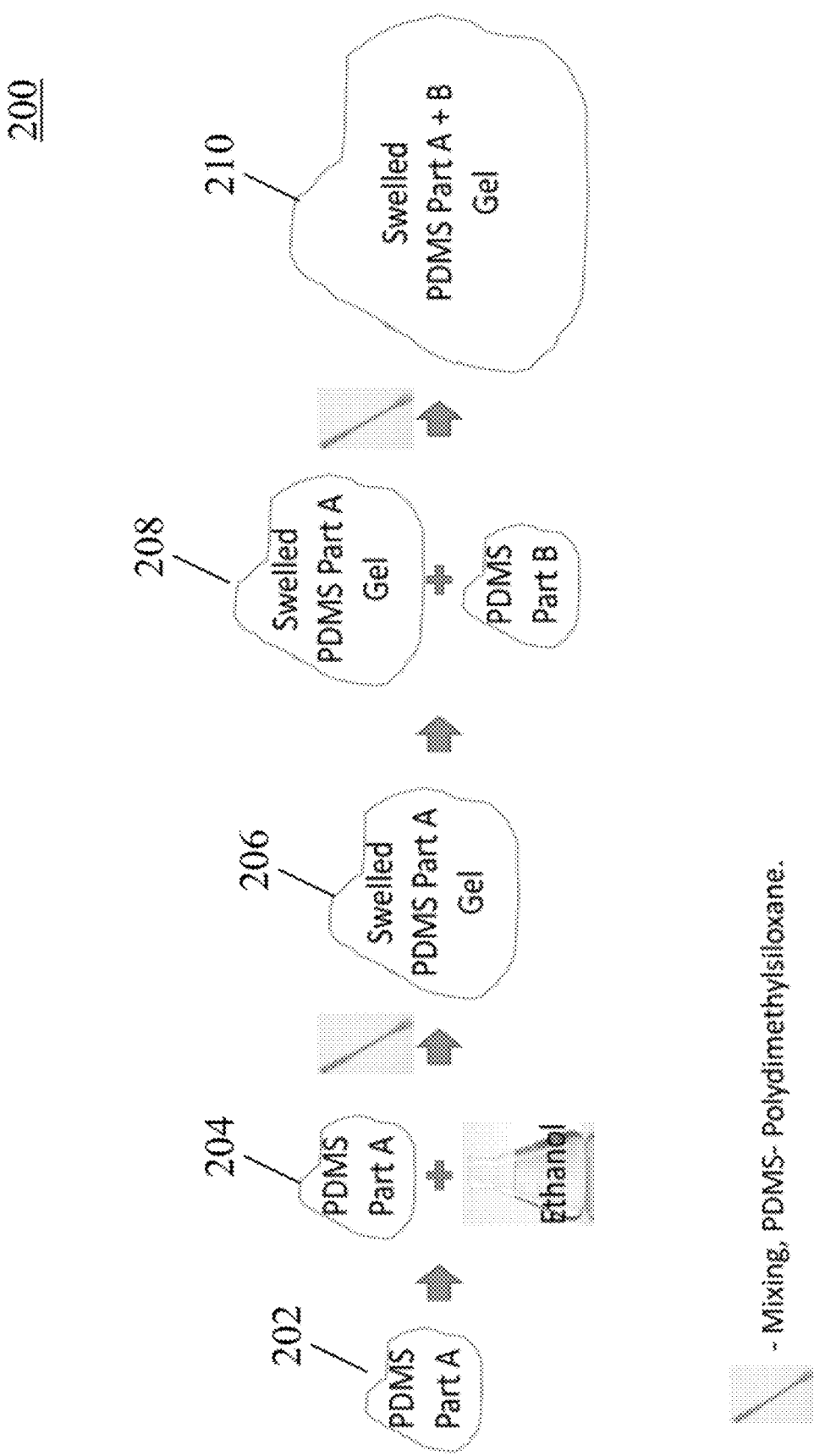
FIG. 2 is an example of manufacturing an actuating material in accordance with some embodiments of the disclosed subject matter.

FIG. 2 shows an example of mixing process 200 of the composite material with the vaporizable fluid as discussed in connection with FIG. 1 (e.g., element 104). For example, in some embodiments, a first part of PDMS gel (PDMS Part-A) composite material 202 is mixed with various amounts of ethanol (0-33 vol %) 204. As a result, the mixed ethanol causes swelling of the PDMS Part-A gel as shown at 206. Subsequently, at 208, a second part of PDMS gel (PDMS Part-B) is added to the swelled gel and mixed thoroughly in order to obtain the bulk actuating material at 210. Specifically, such mixing process, allows for the introduction of air bubbles, occupied by the vaporizable fluid, in the cured actuating material providing a solid that contains isolated pores, which can be inflated upon the phase transition (e.g., liquid-vapor) and/or continuous expansion of the vaporizable fluid (e.g., ethanol). In some embodiments, the vaporizable fluid spreads in the inner walls of the bubbles while air and vapors remain in the inner part of the bubbles and causes expansion upon heating. In some embodiments, the mixed material is both castable and 3D-printable, and will solidify in room-temperature curing. During the curing, the vaporizable fluid occupies the air bubbles, and creates new pores. The pores are expanded until equilibrium between the internal vapor pressure and external environment pressure is achieved. In some embodiments, the density of the mixed material including 20 vol. % ethanol is 0.84 g/cm$^3$.

Figure 3:
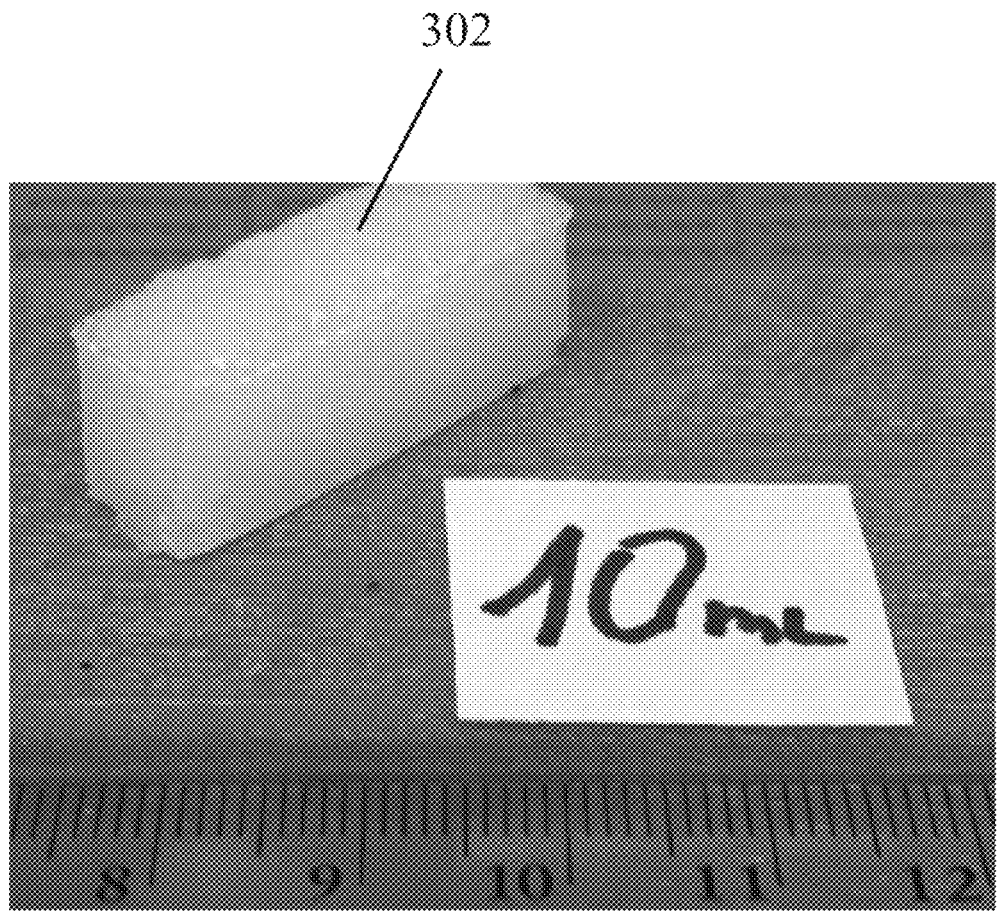
FIG. 3 is an example of an actuating material in accordance with some embodiments of the disclosed subject matter.

FIG. 3 shows an example 300 of a vapor pressure solid actuating material in accordance with some embodiments of the disclosed subject matter. Specifically, vapor pressure solid 302 includes a PDMS elastometric matrix material as described in connection with FIG. 1 that is infused by a low-melting liquid such as ethanol. Specifically, the fluid is infused in the matrix material by mixing until the material exhibits swelling properties and the ethanol liquid is fully integrated with the PDMS matrix material. For example, in some embodiments, desired properties of the actuating material can be achieved by adding 0.5 ml of liquid to each 1 ml of PDMS. Upon mixing, the material is left for curing to ensure full integration of the vaporizable fluid in the matrix material. In some embodiments, curing times can be adaptively controlled to allow for different properties of the resulting actuating material. After curing, a soft solid material with entrapped fluid is obtained (e.g., 302). The actuating material is capable of significantly expanding upon heating (e.g., 100 vol. %) and contracting to its initial dimensions upon cooling.

Figure 4:
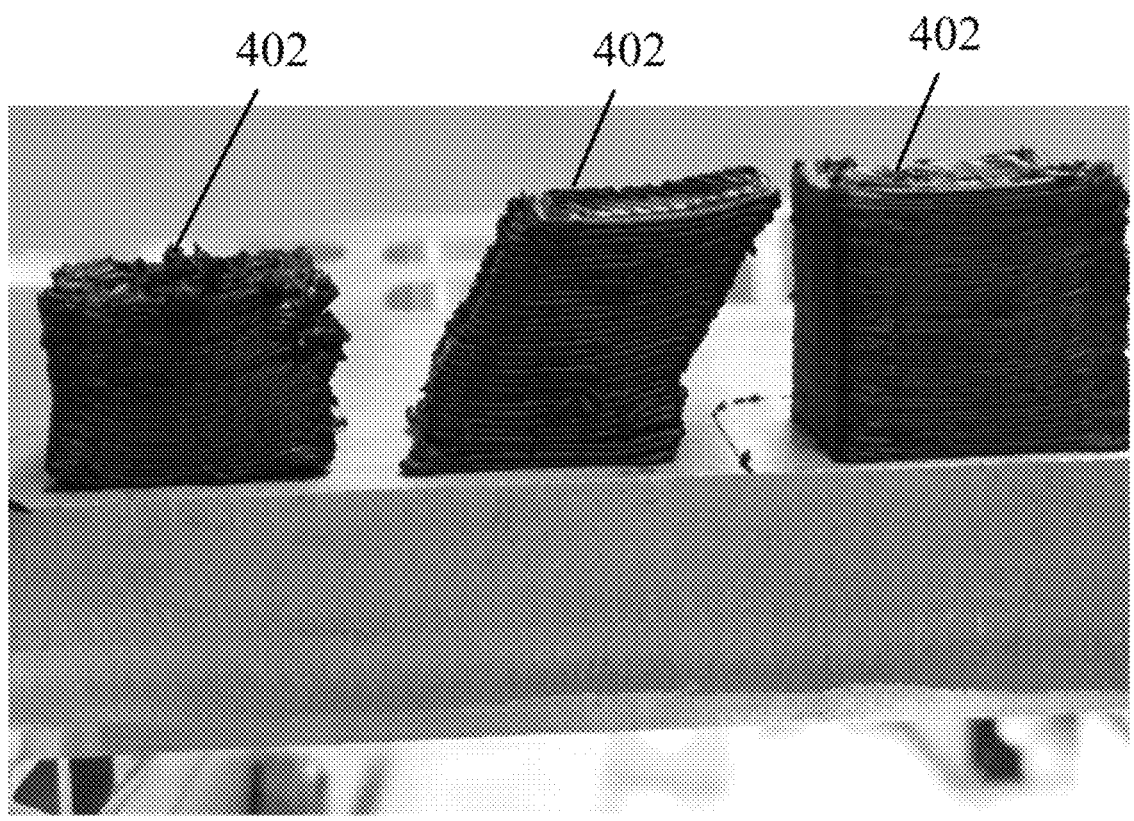
FIG. 4 is an example of a heating component for an actuating material in accordance with some embodiments of the disclosed subject matter.

FIG. 4 shows an example 400 of a conductive heater that can be embedded in the actuating material in accordance with some embodiments of the disclosed subject matter. Specifically, conductive heater 402 can be produced using 3D printing techniques wherein the composite materials include carbon black and PDMS matrix material infused in ethanol or other suitable fluids. For example, in some embodiments, carbon black material can be added to the PDMS along with ethanol by a ratio of 0.1 g carbon black and 0.5 ml ethanol to each 1 ml of PDMS. The materials can be mixed and left to cure in order to provide the desired electrochemical properties. For example, such a conductive heater can exhibit a resistance of less than 100 Ohm, capable of conducting electrical current and allowing for rapid Joule heating while cooling down rapidly when the heating is terminated.

Figure 5:
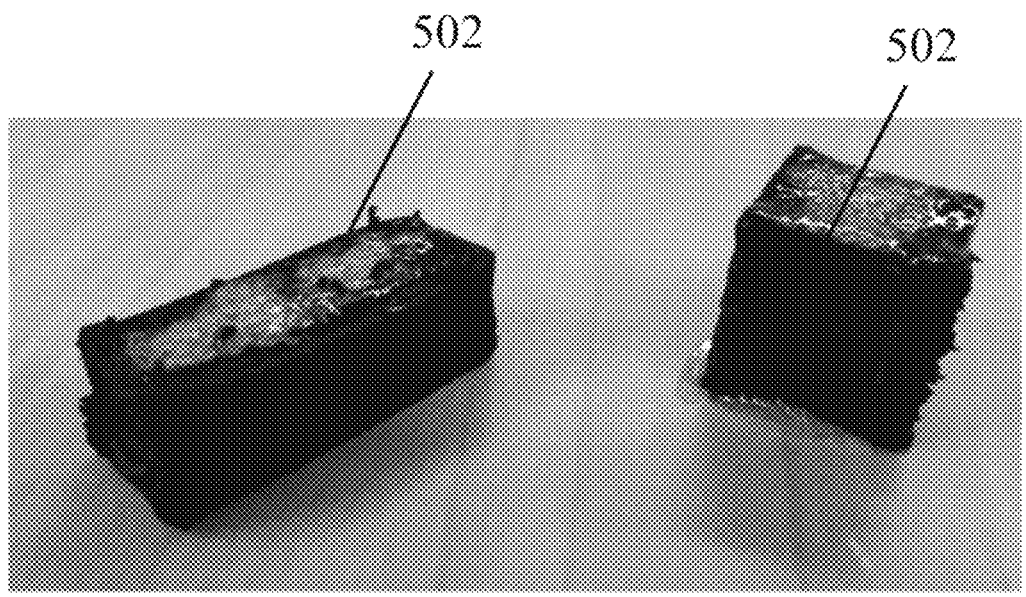
FIG. 5 is an example of an actuating material including a heating component in accordance with some embodiments of the disclosed subject matter.

FIG. 5 shows an example 500 of a vapor pressure solid actuating material deposited inside the conductive heater 502 as described in connection with FIG. 4. Deposition of the vapor pressure solid can be performed in various suitable manners. In some embodiments, contact between the conductive heater and the vapor pressure solid can result in adaptively controlling the actuation of the material using selective alteration of heating and cooling cycles by means of allowing and/or interrupting the passing of the electrical current through the conductive heater. Higher current or more evenly distributed heating can produce faster expansion. Similarly, better thermal conductivity can produce faster cooling.

Figure 6:
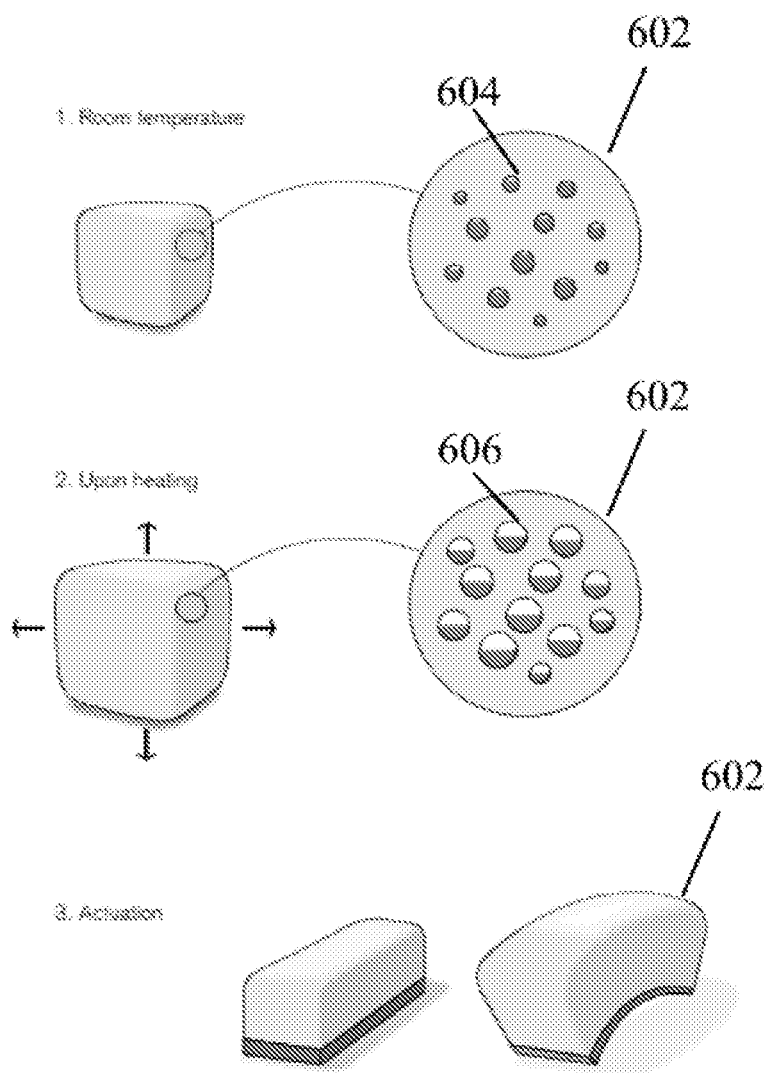
FIG. 6 is an illustration of an actuation of a vapor pressure solid actuating material in accordance with some embodiments of the disclosed subject matter.

FIG. 6 shows an example 600 of the different phases of an actuating material (e.g., vapor pressure solid) during heating as described in connection with FIG. 1. Specifically, matrix material 602 (e.g., silicon rubber matrix) is infused by vaporizable fluid 604 (e.g., ethanol) by for example soaking and curing while at room temperature. Subsequently, upon heating the composite material 602 using a heating element and/or a conductive heating technique, vaporizable fluid 604 commences to produce vapors 606. As a result, composite material 602 begins to expand and actuates a force and/or displacement of volume based on the pressure of the vapor.

Figure 7:
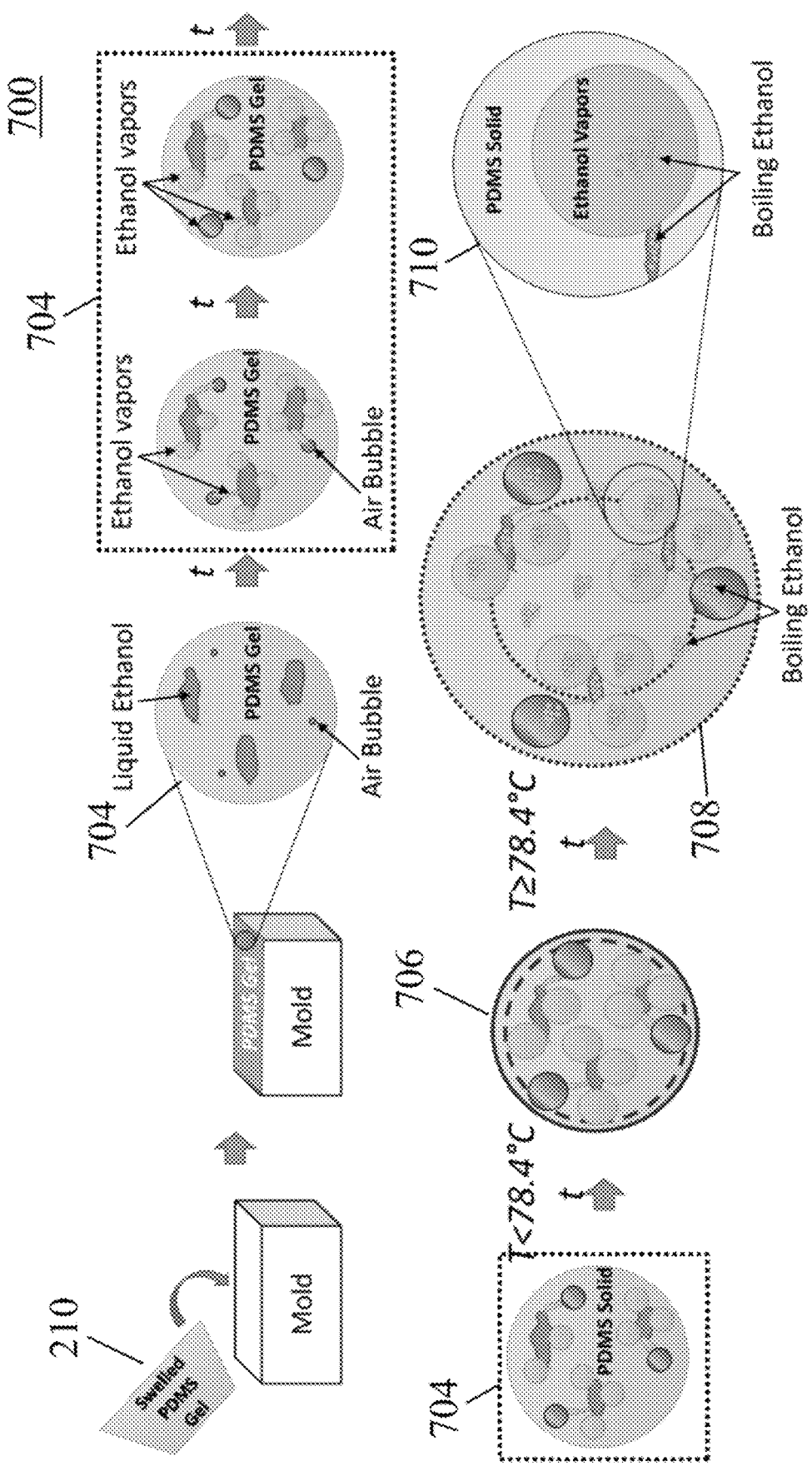
FIG. 7 is an illustration of preparing and actuating a vapor pressure solid actuating material in accordance with some embodiments of the disclosed subject matter.

FIG. 7 shows an example 700 of the different microscale phases of the preparation and actuation of the bulk actuating material (e.g., vapor pressure solid) as discussed above in connection with FIGS. 2 and 6. Specifically, at 702, swelled PDMS gel infused with ethanol 210 is casted and molded in order to cure and attain its final physical properties (e.g., harden, bond etc.) In some embodiments, molding and shaping can be performed automatically using 3D printing. At 704, the actuating material is at the early stages of curing whereby the infused vaporizable fluid (e.g., ethanol) has not yet reached its boiling temperature (e.g., 78.4° C.). Subsequently, as the actuating material is introduced to increasing temperatures at 704 the ethanol liquid is exposed to a rising vapor pressure, which leads to an initial volume expansion of the actuating bulk material as it approaches the fluid's phase transition boiling point (e.g., 78.4° C.) at 706. In some embodiments, such initial volume expansion can reach up to 50% of the original volume. Importantly, once the temperature reaches the fluid's phase transition point (e.g., boiling point) at 708, the vaporizable fluid (e.g., ethanol) will commence to boil leading to an immediate increase of the pressure within the bulk material. As a result, at 710, the actuating material will start to expand due to the gas expansion in order to equalize the external and internal pressure. In some embodiments, such volume expansion can reach up to 900% of the original volume at a temperature of 95° C.

Figure 8:
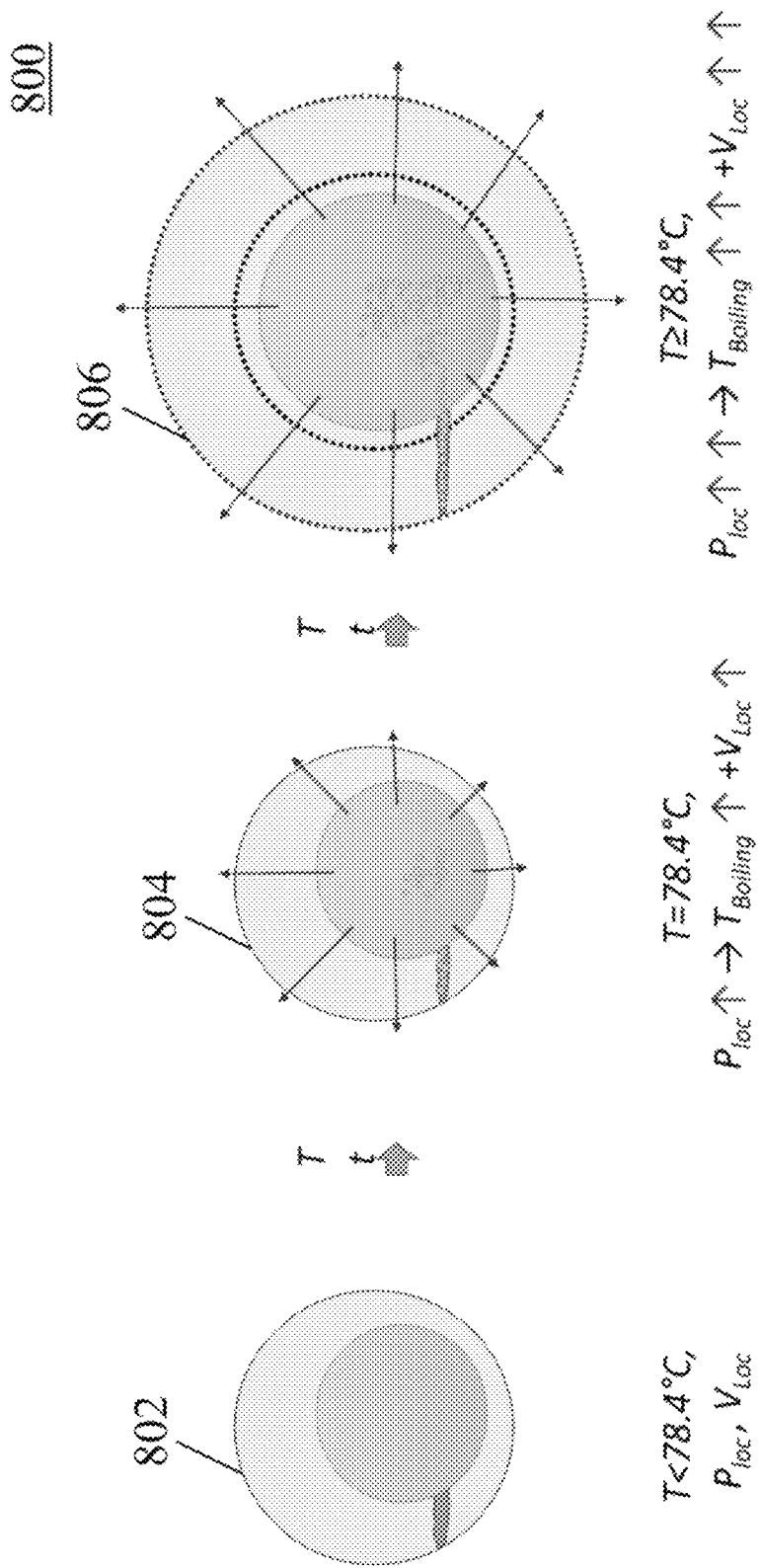
FIG. 8 is an illustration of an actuation of a vapor pressure solid actuating material in accordance with some embodiments of the disclosed subject matter.

FIG. 8 shows an example 800 of the different actuation phases of the bulk actuating material (e.g., vapor pressure solid) and the relationships between the local volume, boiling temperature and local pressure. For example, at 802 while the actuating material is at rest (e.g., room temperature, pressure) no volume expansion is observed. At 804, as the material is exposed to increasing temperatures reaching the boiling point of the vaporizable fluid, the local pressure of the material increases. As a result, the volume of the material exhibits an initial expansion, while the boiling point of the fluid also increases requiring the exposure of the material to constantly increasing temperatures in order to sustain the actuation. At 806, once the temperature has exceeded the boiling point of the vaporizable fluid, the volume expansion is maximized as is the local pressure. In some embodiments, such volume maximization allows for the actuating material to lift weight that is 6000 times that of its own.

Figure 9:
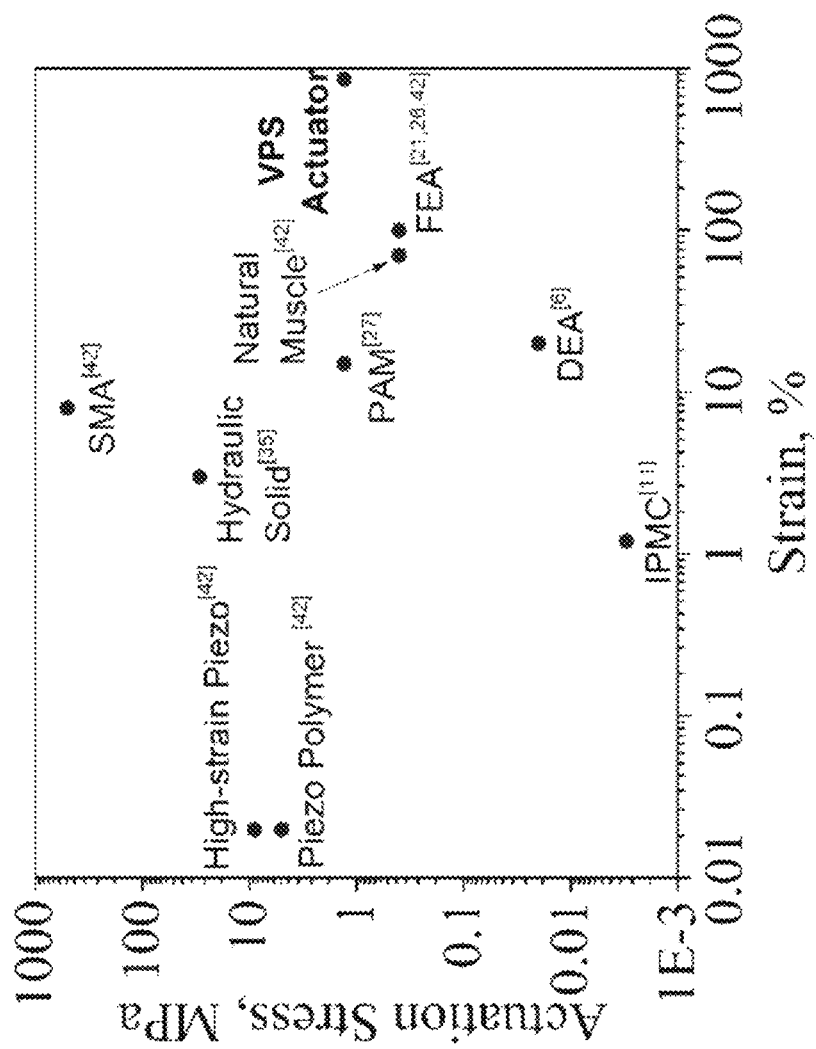
FIG. 9 is a graphical representation of a strain-stress curve for a vapor pressure solid actuating material in accordance with some embodiments of the disclosed subject matter.

FIG. 9 shows a graphical representation of results obtained for the disclosed vapor pressure solid actuating material compared to other actuating materials. Graphic 900 represents a stress-strain curve of the different materials whereby stress refers to an internal force within the material associated with the deformation of the material and strain refers to the relative change in shape and size (e.g., deformation) of the material. Graphic 900 shows that the vapor pressure solid actuating material exhibits the highest strain (e.g., deformation) while experiencing moderate stress to achieve the illustrated strain. As a result, such actuating material, which does not require the use of additional equipment to induce actuation can be used for low-cost, safe and controllable miniature soft actuation systems.

Figure 10A:
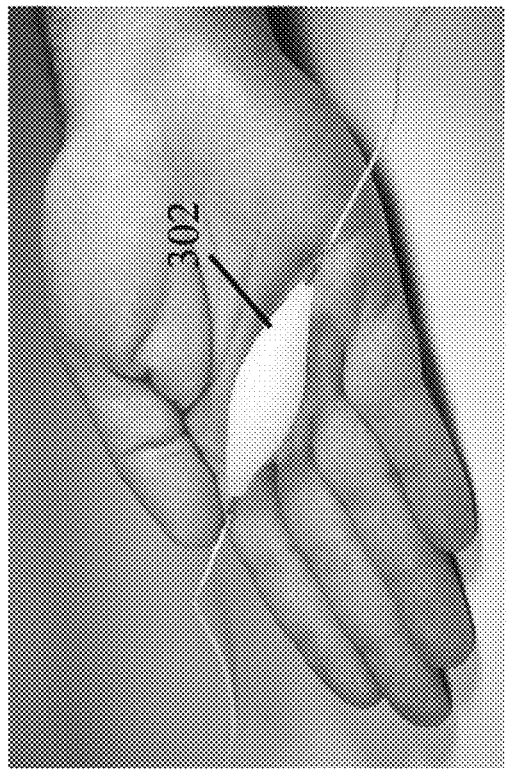
FIGS. 10A and 10B are examples of an actuating material shown during its initial phase (FIG. 10A) and its expanded phase (FIG. 10B) in accordance with some embodiments of the disclosed subject matter.
Figure 10B:
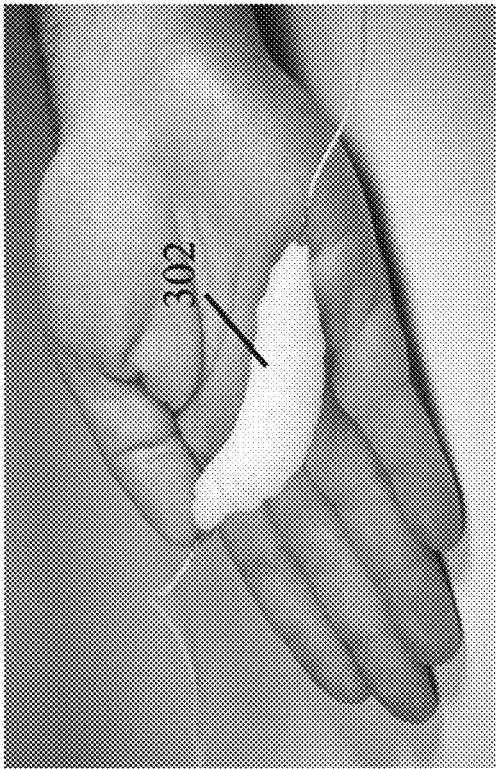

FIG. 10 shows an example of a vapor pressure solid actuating material 302 as discussed previously in reference to FIG. 3. Specifically, actuating material 302 is depicted before (see FIG. 10A) and after (see FIG. 10B) the phase transition process (e.g., liquid-gas transition) of the vaporizable fluid (e.g., ethanol) that results to the expansion of the vapor pressure solid due to increased heating. The vapor pressure solid can be electrically-actuated with a thin-resistive wire operated at low power characteristics (e.g., 8V and 1 A).

FIG. 11 shows a soft-robot using vapor pressure solid actuating material 302 (see FIGS. 11A-11E) in accordance with some embodiments of the disclosed subject matter. In some embodiments, actuating material 302 is formed onto a layer of passive PDMS material 1104 and is used with rigid component 1102 that is able to move as a result of the expansion of the vapor pressure solid actuating material (see FIGS. 11A-11B). The passive PDMS material 1104 is formed with a first end 1108 and a second end 1110. In some embodiments, the first end 1108 is formed with solid materials, and the second end is coupled to the rigid component 1102. A notch 1106 can be formed in the actuating material 302 to facilitate bending. During actuation, the actuating material 302 expands and pushes the first end 1108 inwards along the axis of contraction. The actuation motion causes the first end 1108 to push against the floor and causes the rigid component 1102 to move in the opposite direction, along the axis of contraction.

Figure 11B:
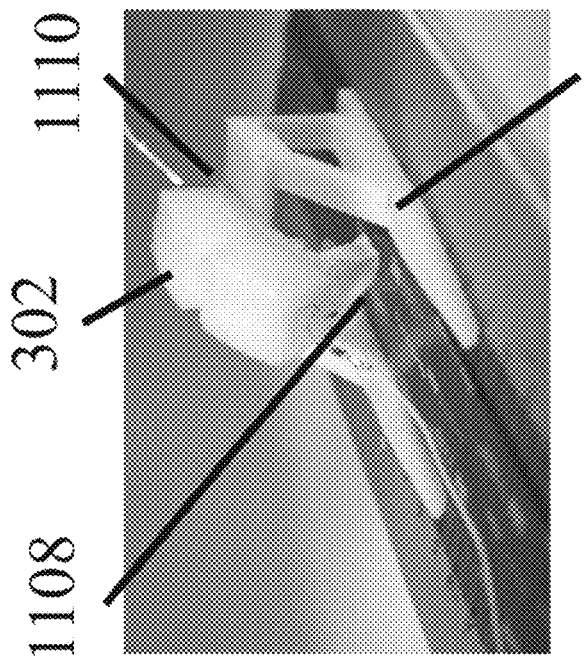
Figure 11A:
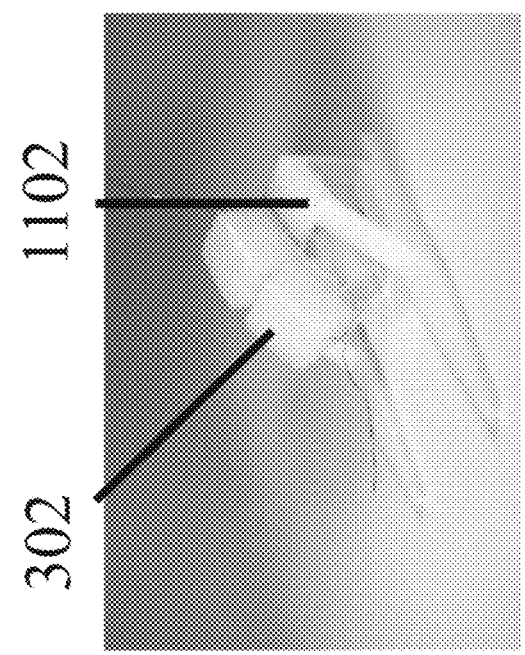
Figure 11C:
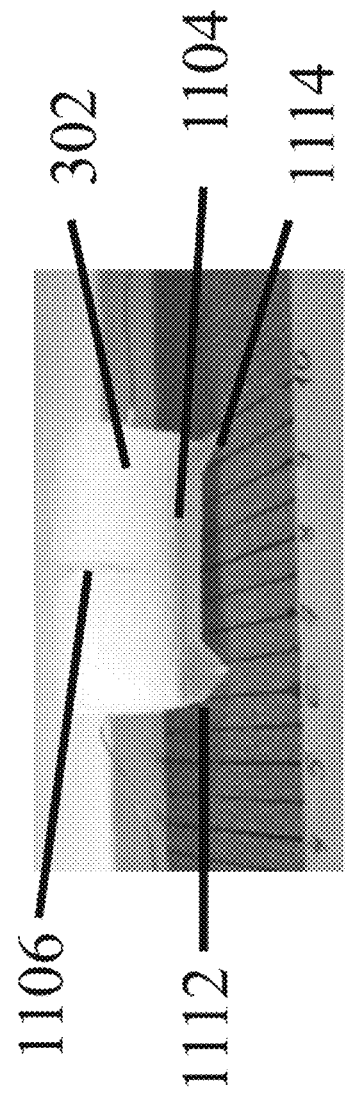

In some embodiments, the layer of passive PDMS material 1104 includes a solid first end 1112 and a soft second end 1114 (see FIG. 11C). During actuation, the actuating material 302 expands and bends due to the constricting force near the vicinity of the passive PDMS material 1104. As the actuating material 302 bends, the soft second end 1114 is pulled inward advancing it along the axis of actuation. During contraction of the material, the solid first end 1112 advances along the same axis while the soft second end 1114 remains in place, causing the soft-robot to move.

Figure 11D:
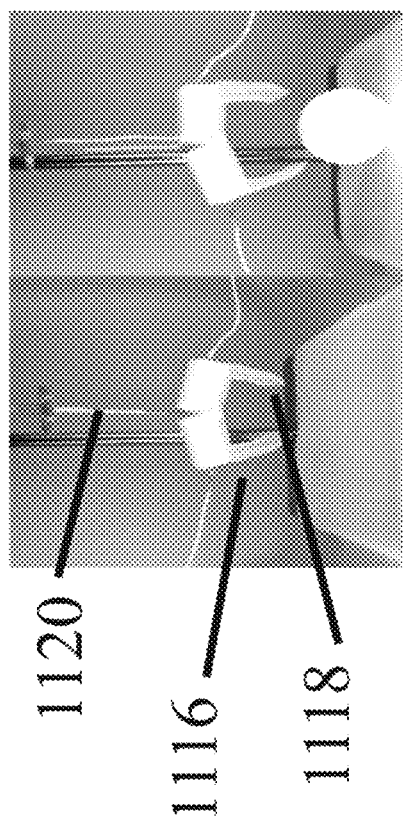
Figure 11E:
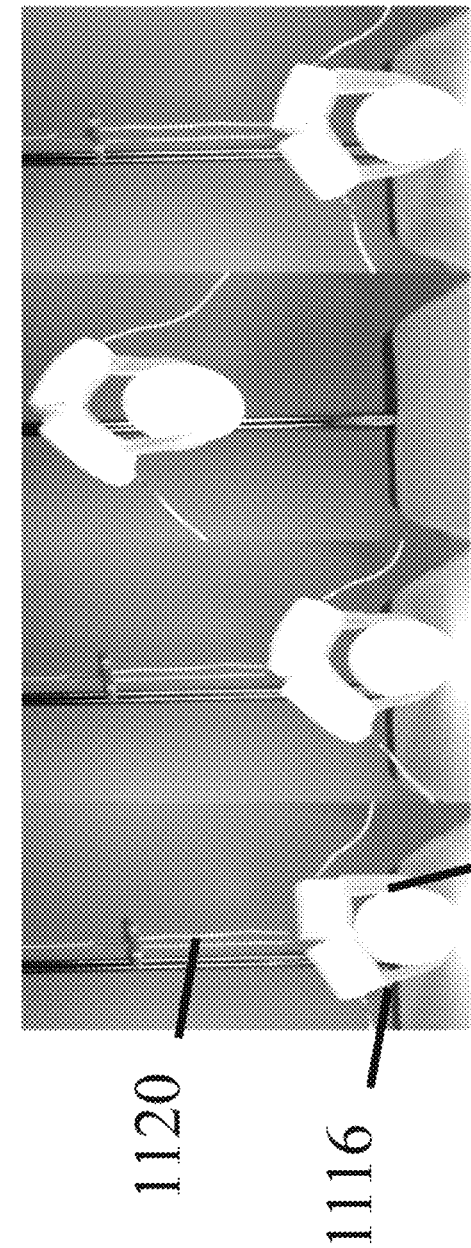

In some embodiments, the layer of passive PDMS material 1104 includes a gripper having a first finger 1116 and a second finger 1118 (see FIGS. 11D and 11E). During actuation, the actuating material 302 expands and bends causing fingers 1116 and 1118 to move inwards in a grasping motion. The actuating material 302 can remain actuated allowing the fingers 1116 and 1118 to grasp and lock onto an object. The force applied by fingers 1116 and 1118 can be adaptively controlled to enable further manipulation of the object. The fingers 1116 and 1118 can be coupled to a moveable robotic arm 1120 enabling further manipulation and movement of the object. The fingers 1116 and 1118 can be constructed of soft materials ensuring the safe manipulation of fragile items, such as for example, an egg.

FIG. 12 shows a soft-robot using a vapor pressure solid actuating material in accordance with some embodiments of the disclosed subject matter. Specifically, the actuating material is enclosed in movable member 1202 and coupled to a resistive wire conveying electrical current. The movable member 1202 operates similarly to a piston and moves triangular base 1204 of a pyramidal structure upon heating and subsequent expansion of the enclosed actuating material. For example, when the actuating material is actuated, the movable member 1202 moves an upper part of bar 1206 in a forward direction. Upon contraction of the actuating material, the bar 1206 exerts a force against the floor moving the pyramidal structure in the forward direction. The actuating material can move the pyramidal structure by applying current (8V and 1 A) through the resistive wire. In some embodiments, the actuating material can be embedded in a Teflon sleeve.

FIG. 13 shows a soft-robot using a vapor pressure solid actuating material to implement a McKibben-type muscle in accordance with some embodiments of the disclosed subject matter. As shown in FIG. 13, an actuating material 1301 is placed inside a braided mesh sleeving 1302, fixed at the edges. In some embodiments, the mesh sleeve can be 25.4 mm in diameter. The edges can be fixed using, for example, zip ties, to ensure that it is firmly harnessed inside the net, thus preventing undesirable axial expansion during actuation. The McKibben type muscle can be used without any compressors or pressure-regulating equipment, and is thus a self-sufficient artificial muscle. As shown in 13B, the McKibben type muscle is capable of lifting weights 1303 much larger than its own. For example, FIG. 13B shows a 13 g actuator lifting a 1 kg weight. FIGS. 13C shows the McKibben type muscle used as a bicep 1304, to contract and pull the lower arm up, and causing it to bend at the elbow. According to some embodiments, the actuation can be electrically driven using a spiral-shaped resistive wire passing inside the actuator. The resistive wire can be powered at, for example, 30 V and 1.5 A. In some embodiments, the resistive wire can be constructed of a Ni—Cr alloy. During actuation, a composite material can expand radially and contract longitudinally, mimicking natural muscle behavior.

In some embodiments, efficiency of an actuator heated by a resistive wire can be estimated as a ratio between an amount of mechanical work produced over a unit of time, and an amount of invested (consumed) electrical energy. For example, if the voltage is 15, the current is 1 A (making the consumed electrical power measured as the product of the applied DC voltage and current 15 W), the time it takes the actuator to reach a force of 60 N is 70 seconds, the strain level at 60 N force is 70%, and the linear expansion of a 40 mm long specimen is 0.7×40 mm (28 mm, or 0.028 m), then the mechanical work done by the actuator can be calculated as a product of the force and the distance, (namely 60 N·0.028 m=1.68 J). In this example, the output power is 1.68 J/70 s=0.024 W, and the efficiency of the actuator is 0.024 W/15 W·100% 0.2%. In some embodiments, the efficiency is related to the design of the resistive wire. The design can be, for example, single-, double-, or triple-coiled wires. As shown in FIG. 14, heating times can vary significantly based on the design of wire. For example, a triple-coiled wire shortens the heating time by 40%, thereby increasing the efficiency of the actuator. In this way, changes to the wire design that increase the uniform distribution of heat will in turn increase the efficiency of the actuator material.

In some embodiments, the efficiency and operation of the actuator material also depend on heating and cooling rates. For resistive heating, higher currents or more distributed heating networks are more likely to provide faster material expansion. For cooling, an optimized design of the actuator geometry and the surface area can facilitate faster cooling rates. For example, a thin strip with large surface-to-volume ratio is likely to cool much faster than bulk material. Active cooling solutions, such as for example Peltier junctions or liquid-flow cooling channels, can be used to facilitate such cooling rates. In liquid-flow cooling channels, as silicone repels water, internal channels can be designed in the soft material for water-flow cooling.

FIG. 15 shows a soft-robot using a vapor pressure solid actuating material to implement an agonist-antagonist bicep muscle pair in accordance with some embodiments of the disclosed subject matter. During the contraction of the biceps, the arm is bent at the elbow and triceps are relaxed; the opposite occurs during expansion or relaxation of the biceps. Such a configuration can significantly reduce the de-actuation time of the actuator. Once a first actuator 1501 (e.g., the biceps) completes its work to bend the arm, the task of bringing the arm back into its initial open position can be done by triggering a second actuator 1502 (triceps), instead of waiting for the cooling of the biceps 1501.

FIG. 16 shows a soft-robot using a vapor pressure solid actuating material to implement a soft walker robot for rejuvenation testing in accordance with some embodiments of the disclosed subject matter. As shown in FIG. 16, the soft walker robot can be fabricated by casting actuator material into a plastic mold with a thin cloth layer 1601 placed at the bottom. The cloth can be non-stretchable and provide flexibility and bi-morph bending of the robot at actuation. The soft walker robot can include three Ni—Cr spirals, distributed between its front, middle, and back to provide electrically-driven (Joule) heating using 15 V, 1 A. The power can be supplied from three distinct power supplies.

In some embodiments in which ethanol escape occurs during prolonged actuation thus compromising performance, the actuator material can be rejuvenated. Actuator material can be rejuvenated by immersing the actuator in ethanol, allowing its diffusion into the silicone-based material until saturation. Repeatable rejuvenation of an actuator can provide retention of up to 100% of a soft walker robot's functionality. In some embodiments, rejuvenation can keep a soft walker robot actuated under extreme conditions. Thus, rejuvenation of the actuator material, whereby the actuator is exposed to direct contact with ethanol, can facilitate the revival of the actuation performance after prolonged service. Additionally, rejuvenation can be utilized for designing saturation-based self-healing soft material-actuators.

Rejuvenation testing of soft walker robots can be performed by recording the amount of time required to induce an axial contraction of 15%. Rejuvenated soft walker robots will take less time to reach 15% contraction than exhausted soft walker robots. This can be attributed to ethanol escape from the composite during prolonged actuation. Rejuvenation can also be performed by electrically-actuating the soft walker robots to achieve bi-morph bending of the soft material comprising its body for extended periods of time (e.g., 10 minutes). An example of the bi-morph bending of a soft walker robot is shown in FIG. 17, whereby the soft walker robot was actuated and kept in its maximal bending position for 10 min, creating extreme conditions, whereby a prolonged actuation cycle would markedly increase its temperature, resulting in significant ethanol escape. After actuation, the robot was immersed in ethanol in a closed container. FIG. 17(*a*) shows soft walker robots that are rejuvenated, while FIG. 17(*b*) shows untreated soft walker robots. As can be seen from the images shown in FIG. 17, the rejuvenated robot performance was superior to that of the exhausted one at each measuring time point. The non-rejuvenated robots' performance declined to below 50% after the first exhausting run, decreasing to below 25% overall. On the other hand, the rejuvenated robots retained their full performance capability for three rejuvenation cycles, followed by a decrease to about 75% at the fourth rejuvenation cycle. Towards the end of the testing, the performance of the rejuvenated robots gradually decreased to the asymptotic value of about 55%.

The embodiments described in this disclosure can be combined in various ways. Any aspect or feature that is described for one embodiment can be incorporated into any other embodiment mentioned in this disclosure. Accordingly, while various novel features of the inventive principles have been shown, described and pointed out as applied to particular embodiments thereof, it should be understood that various omissions and substitutions and changes in the form and details of the systems and methods described and illustrated, may be made by those skilled in the art without departing from the spirit of the invention. Amongst other things, the steps of any described methods may be carried out in different orders in many cases where such may be appropriate. Those skilled in the art will recognize, based on the above disclosure and an understanding therefrom of the teachings of the inventive principles, that different configurations and devices can be used to implement the general functionality and different embodiments of the inventive principles. Any particular method components are for illustrative purposes to facilitate a full and complete understanding and appreciation of the various aspects and functionality of particular embodiments of the present principles. Those skilled in the art will appreciate that the inventive principles can be practiced in other than the described embodiments, which are presented for purposes of illustration and not limitation.

The invention claimed is:

1. An article of manufacture comprising:
a first matrix material capable of being mixed with one or more vaporizable fluids, wherein mixing the one or more vaporizable fluids causes the first matrix material to swell;
a second matrix material capable of being mixed with the swelled first matrix material to produce an actuating material, wherein heating the actuating material causes inflation of the actuating material based on pressure applied by vapors resulting from expansion of one or more vaporizable fluids;
a heating element, wherein the heating element is a resistor embedded in the actuating material; and
a layer of passive Polydimethysiloxane ("PDMS") material having a first end and a second end, wherein the actuating material is formed onto the layer of passive PDMS material, and wherein actuation and contraction of the actuating material causes the article of manufacture to advance along an axis of contraction.

2. An article of manufacture comprising:
a first matrix material capable of being mixed with one or more vaporizable fluids, wherein mixing the one or more vaporizable fluids causes the first matrix material to swell;
a second matrix material capable of being mixed with the swelled first matrix material to produce an actuating material, wherein heating the actuating material causes inflation of the actuating material based on pressure applied by vapors resulting from expansion of one or more vaporizable fluids;
a heating element, wherein the heating element is a resistor embedded in the actuating material;
a layer of passive Polydimethysiloxane ("PDMS") material having a first end and a second end, wherein the actuating material is formed onto the layer of passive PDMS material; and
a gripper comprising a first finger and a second finger, the first finger coupled to the first end of the layer of passive PDMS material and the second finger couple second end of the layer of passive PDMS material,
wherein actuation of the actuating material causes the gripper to manipulate an object.

3. An article of manufacture comprising:
a first matrix material capable of being mixed with one or more vaporizable fluids, wherein mixing the one or more vaporizable fluids causes the first matrix material to swell;
a second matrix material capable of being mixed with the swelled first matrix material to produce an actuating material, wherein heating the actuating material causes inflation of the actuating material based on pressure applied by vapors resulting from expansion of one or more vaporizable fluids;
a heating element, wherein the heating element is a resistor embedded in the actuating material;
a base;
a movable member coupled to the base, wherein the actuating material is enclosed in the movable member; and
a bar coupled to the movable member,
wherein contraction of the actuating material causes the base to advance along an axis of contraction.

4. The article of manufacture of claim 1 wherein cooling the actuating material causes contraction of the actuating material.

5. The article of manufacture of claim 1 wherein the one or more vaporizable fluids is captive in the first matrix material.

6. The article of manufacture of claim 1 wherein the first matrix material is soaked and cured in the one or more vaporizable fluids.

7. The article of manufacture of claim 1 wherein the first and second matrix materials are selected from a group consisting of silicone rubber, polymers, resins and latex.

8. The article of manufacture of claim 7 wherein the polymer of the first or second matrix materials is selected from the group consisting of Polydimethysiloxane ("PDMS"), platinum-catalyzed PDMS, and tin-catalyzed PDMS.

9. The article of manufacture of claim 1 wherein the one or more vaporizable fluids is selected from a group consisting of ethanol, acetone, water, glycerin and etheric compounds.

10. The article of manufacture of claim 1 further comprising a plurality of heating elements configured to independently heat different portions of the actuating material.

11. The article of manufacture of claim 1 further comprising one or more cooling elements configured to accelerate cooling of the actuating material.

12. The article of manufacture of claim 1 further comprising one or more conductive materials for heating the one or more vaporizable fluids.

13. The article of manufacture of claim 2 wherein cooling the actuating material causes contraction of the actuating material.

14. The article of manufacture of claim 2 wherein the one or more vaporizable fluids is captive in the first matrix material.

15. The article of manufacture of claim 2 wherein the first matrix material is soaked and cured in the one or more vaporizable fluids.

16. The article of manufacture of claim 2 wherein the first and second matrix materials are selected from a group consisting of silicone rubber, polymers, resins and latex.

17. The article of manufacture of claim 16 wherein the polymer of the first or second matrix materials is selected from the group consisting of Polydimethysiloxane ("PDMS"), platinum-catalyzed PDMS, and tin-catalyzed PDMS.

18. The article of manufacture of claim 2 wherein the one or more vaporizable fluids is selected from a group consisting of ethanol, acetone, water, glycerin and etheric compounds.

19. The article of manufacture of claim 2 further comprising a plurality of heating elements configured to independently heat different portions of the actuating material.

20. The article of manufacture of claim 2 further comprising one or more cooling elements configured to accelerate cooling of the actuating material.

21. The article of manufacture of claim 2 further comprising one or more conductive materials for heating the one or more vaporizable fluids.

22. The article of manufacture of claim 3 wherein cooling the actuating material causes contraction of the actuating material.

23. The article of manufacture of claim 3 wherein the one or more vaporizable fluids is captive in the first matrix material.

24. The article of manufacture of claim 3 wherein the first matrix material is soaked and cured in the one or more vaporizable fluids.

25. The article of manufacture of claim 3 wherein the first and second matrix materials are selected from a group consisting of silicone rubber, polymers, resins and latex.

26. The article of manufacture of claim 25 wherein the polymer of the first or second matrix materials is selected from the group consisting of Polydimethysiloxane ("PDMS"), platinum-catalyzed PDMS, and tin-catalyzed PDMS.

27. The article of manufacture of claim 3 wherein the one or more vaporizable fluids is selected from a group consisting of ethanol, acetone, water, glycerin and etheric compounds.

28. The article of manufacture of claim 3 further comprising a plurality of heating elements configured to independently heat different portions of the actuating material.

29. The article of manufacture of claim 3 further comprising one or more cooling elements configured to accelerate cooling of the actuating material.

30. The article of manufacture of claim 3 further comprising one or more conductive materials for heating the one or more vaporizable fluids.

\* \* \* \* \*